No. 862,487. PATENTED AUG. 6, 1907.
J. KIRKPATRICK.
HARROW CART.
APPLICATION FILED JAN. 29, 1907.
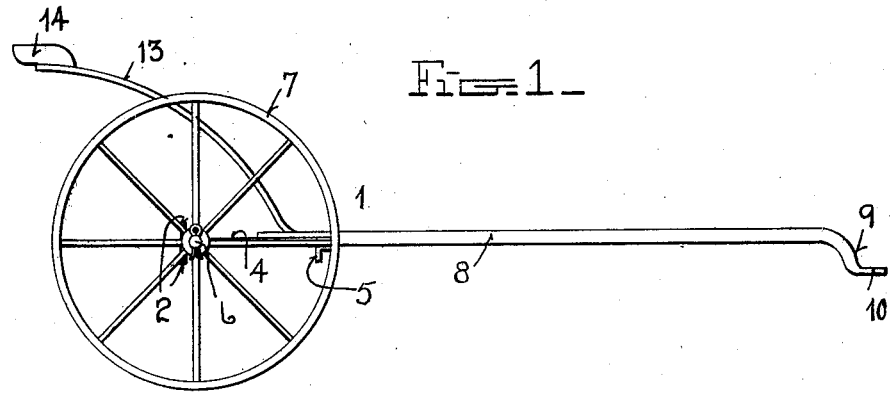
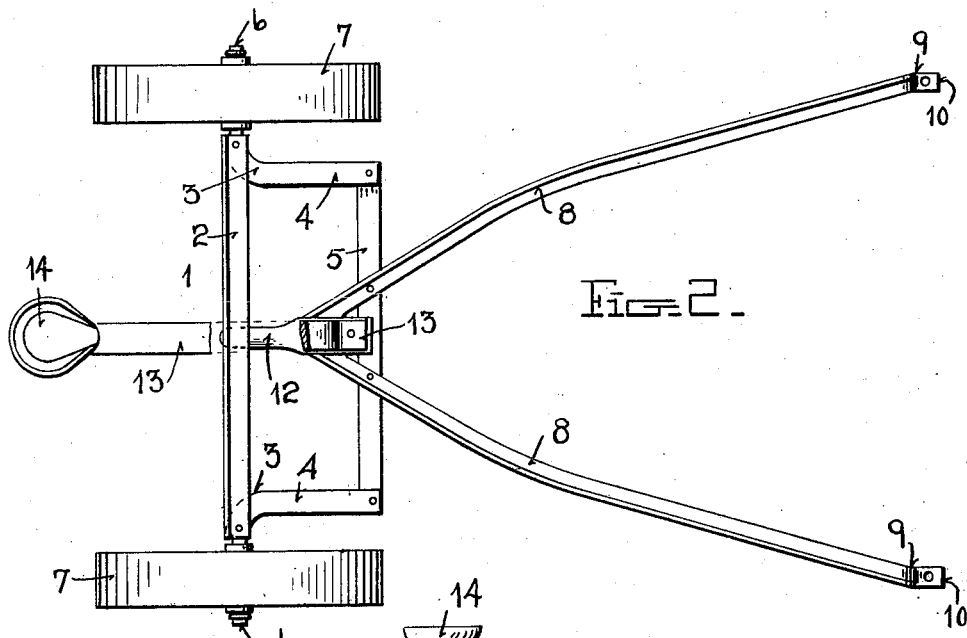
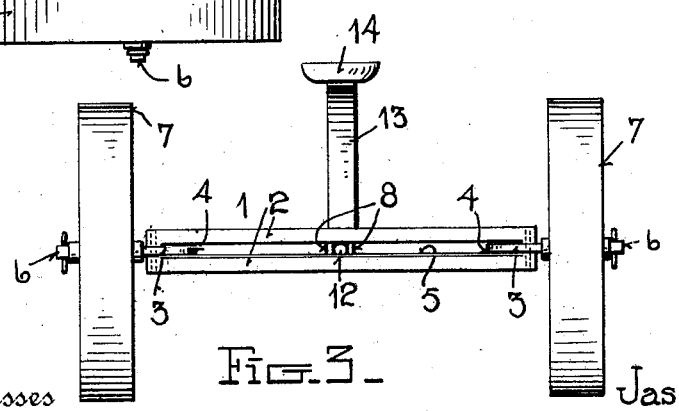
Inventor
Jas. Kirkpatrick

UNITED STATES PATENT OFFICE.

JAMES KIRKPATRICK, OF HUDSON, WISCONSIN, ASSIGNOR OF ONE-HALF TO ALEXANDER R. TURNER, OF HUDSON, WISCONSIN.

HARROW-CART.

No. 862,487.

Specification of Letters Patent.

Patented Aug. 6, 1907.

Application filed January 29, 1907. Serial No. 354,741.

*To all whom it may concern:*

Be it known that I, JAMES KIRKPATRICK, a citizen of the United States, residing at Hudson, in the county of St. Croix and State of Wisconsin, have invented certain new and useful Improvements in Harrow-Carts; and I do declare the following to be a full, clear, and exact description of the invention, such as will enable others skilled in the art to which it appertains to make and use the same.
This invention relates to improvements in carts or riding attachments for harrows.

The object of the invention is to provide an attachment of this character constructed and arranged so that when attached to a harrow it will conform to the movements of and follow directly in the rear of the same.

With the above and other objects in view, the invention consists of certain novel features of construction, combination and arrangement of parts, as will be hereinafter described and claimed.
In the accompanying drawings:—Figure 1 is a side view of a harrow cart constructed in accordance with the invention; Fig. 2 is a top plan view; and Fig. 3 is a rear elevation of the same.

Referring more particularly to the drawing, 1 denotes the cart, which consists of a framework formed of transversely-disposed, parallel axle supporting bars 2, said bars being preferably formed of angle iron and between the outer ends of the same are pivotally-mounted the axles 3 of the cart. The axles 3 are preferably in the form of short right angularly-bent bars, the inner ends 4 of which project forwardly and are pivotally-connected together by means of an equalizing bar 5. On the opposite ends of the axles are formed spindles 6, upon which the supporting wheels 7 are mounted. The equalizing bar 5 is preferably formed of angle iron, and to the same are bolted or otherwise secured the inner ends of forwardly-projecting, diverging connecting arms or bars 8. The bars 8 are also preferably formed of angle iron, and are bent downwardly at their outer ends, as shown at 9, said downwardly-bent ends being provided with apertured ears or lugs 10 adapted to be bolted or otherwise secured to the harrow bar or evener. The inner ends of the connecting bars 8 are brought together and meet between the equalizing bar and the bars 2 of the frame. To said meeting ends of the connecting bars is secured a rearwardly-projecting guide, stud or pin with roller 12, which is adapted to engage and work between the parallel bars 2 and between the right angularly-bent ends of the axles, as shown.
Secured to the inner end of the arms or bars 8 is an upwardly and rearwardly-projecting seat supporting spring 13, on the upper end of which is arranged a driver's seat 14.

A cart or riding attachment as herein shown and described is adapted to be connected to the harrow bar or evener of any form of harrow to provide a seat for the driver and operator of the harrow. By pivotally-mounting the axle of the harrow frame and connecting the same by the equalizing bar to which the inner ends of the connecting bars 8 are secured, the cart will at all times conform to the movements of the harrow and follow directly in the rear of the same when turning corners or passing around curves.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A cart of the type described comprising a pair of transversely-disposed spaced frame bars, angularly formed axles pivoted between and at the outer ends of said bars, said axles having forwardly extending portions and being provided with wheel receiving spindles, wheels journaled on said spindles, an equalizing bar pivotally connecting the forwardly-projecting portions of the axles, forwardly-extending connecting bars attached at their rear ends to the equalizing bar and adapted to be connected at their forward ends with a narrow evener and a rearwardly-projecting stud operatively connected with the equalizing bar and provided with a roller arranged for movement between the spaced transverse bars.

2. A harrow cart comprising transversely-disposed parallel bars, right angularly-formed axles pivotally-mounted between the opposite ends of said bars, one end of said axles projecting forwardly, supporting wheels journaled on the opposite ends of said axles, an equalizing bar pivotally-connecting the forward ends of the axles, forwardly-projecting diverging connecting bars secured at their inner ends to said equalizing bars and adapted to be connected to the harrow evener at their forward ends, a stud with roller arranged on the inner ends of said connecting bars to engage and work between said parallel transverse bars of the frame, a seat supporting spring secured to the inner ends of the connecting bars and projecting upwardly and rearwardly therefrom, and a seat arranged on the upper end of said spring support, substantially as described.

In testimony whereof I have hereunto set my hand in presence of two subscribing witnesses.

JAMES KIRKPATRICK.

Witnesses:
E. E. GATCHELL,
J. W. KELLY.